(12) United States Patent
Adams et al.

(10) Patent No.: US 7,647,682 B2
(45) Date of Patent: Jan. 19, 2010

(54) MOTOR MOUNT REPAIR SYSTEM AND METHODS THEREFOR

(76) Inventors: Marve D. Adams, 1155 E. Twain #108-237, Las Vegas, NV (US) 89036; Daniel D. Coppola, P.O. Box 36374, North Las Vegas, NV (US) 89036

( * ) Notice: Subject to any disclaimer, the term of this patent is extended or adjusted under 35 U.S.C. 154(b) by 555 days.

(21) Appl. No.: 10/869,251

(22) Filed: Jun. 17, 2004

(65) Prior Publication Data

US 2005/0278921 A1    Dec. 22, 2005

(51) Int. Cl.
*B23P 19/04* (2006.01)

(52) U.S. Cl. .............. 29/402.09; 29/402.18; 29/402.04; 29/402.02

(58) Field of Classification Search ............ 29/402.18, 29/402.09, 402.04, 402.03, 402.02
See application file for complete search history.

(56) References Cited

U.S. PATENT DOCUMENTS

| | | | |
|---|---|---|---|
| 836,083 A | | 11/1906 | Bowley |
| 2,581,845 A | * | 1/1952 | Elliott ...................... 156/303.1 |
| 3,153,685 A | * | 10/1964 | O'Connor .................... 264/28 |
| 3,949,904 A | * | 4/1976 | Hendrickson ............... 222/135 |
| 4,133,913 A | * | 1/1979 | Moore ........................ 427/140 |
| 4,234,369 A | | 11/1980 | Schelkmann |
| 4,245,585 A | * | 1/1981 | Bocquet ..................... 118/410 |
| 4,497,755 A | * | 2/1985 | Korsyn ....................... 264/1.7 |
| 4,529,757 A | * | 7/1985 | Iseler et al. ................. 523/513 |
| 4,818,790 A | * | 4/1989 | Ooka et al. ................. 525/103 |
| 4,865,879 A | | 9/1989 | Finlay |
| 5,358,994 A | * | 10/1994 | Mallow ....................... 524/495 |
| 5,560,395 A | * | 10/1996 | Bissonnette et al. ........... 138/98 |
| 5,827,003 A | | 10/1998 | Konig |
| 6,214,904 B1 | * | 4/2001 | Tanaka et al. ............... 523/409 |
| 6,274,651 B1 | * | 8/2001 | Burrell ....................... 523/521 |
| 6,287,405 B1 | * | 9/2001 | Stevenson et al. ............. 156/94 |
| 6,349,918 B1 | | 2/2002 | Bunker |
| 6,527,849 B2 | | 3/2003 | Dry |
| 2002/0014706 A1 | * | 2/2002 | Tanaka et al. ............... 257/789 |

FOREIGN PATENT DOCUMENTS

| | | | | |
|---|---|---|---|---|
| JP | | 02014237 A | * | 1/1990 |
| JP | | 10007980 A | * | 1/1998 |
| JP | | 2004307721 A | * | 11/2004 |
| WO | WO 2005059000 A1 | | * | 6/2005 |

* cited by examiner

*Primary Examiner*—Essama Omgba
(74) *Attorney, Agent, or Firm*—Jeffrey D. Moy; Weiss & Moy, P.C.

(57) ABSTRACT

A motor mount repair system for use in a component assembly comprising a degradable member, a framework and a bolt-housing shaft of the component assembly includes an adhesion and sealing material comprising at least one resin. The degradable member of the component assembly is coupled in co-operative relationship to both the framework and to the bolt-housing shaft of the component assembly. When applied to the degradable member, the adhesion and sealing material adheres to and seals the degradable member permitting both repair of the degradable member and re-use of the component assembly. The component assembly comprises at least one of a motor mount, a shock absorber end, a sway bar bushing and a control arm bushing. Various methods of repairing the degradable member of the component assembly with the motor mount repair system are used.

10 Claims, 4 Drawing Sheets

MOTOR MOUNT REPAIR SYSTEM AND METHODS THEREFOR

FIELD OF THE INVENTION

This invention relates generally to repair of vibrating vehicle components and, more specifically, to a repair material system for a component assembly of a vehicle coupled to a vibrating member of the vehicle and methods of using the repair material system to both repair and permit reuse of the component assembly.

BACKGROUND OF THE INVENTION

In the past, engine driven vehicles were relatively noisy. Currently, motor vehicles, vessels (such as boats) and other pieces of equipment (such as compressors) which utilize an engine as their source of power typically have an engine coupled to one or more energy absorbing mounts. Typically these energy absorbing mounts dampen vibrations, attenuate sound or lessen destructive forces, which shorten the life of components. Examples of energy absorbing mounts include motor mounts, shock absorber ends, sway bar bushings and control arm bushings.

Initially, primitive energy absorbing mounts simply comprised rubber bushings for absorbing energy which were constrained between two metal plates and further comprised a mounting bolt for coupling to the engine. The construction of energy absorbing mounts has evolved over time as material science and vibration-absorbing technology has improved. Even though materials used for energy absorbing have improved, based on economical considerations and a desire to absorb a greater amount of vibration, sound and destructive forces, the energy absorbing portion of the mount has been made of softer materials without compensating for the reduced durability of the energy absorbing portion of the mount. The softening of this energy absorbing material has led to shorter mount life since the softer energy absorbing material degenerates more rapidly.

Typically, a motor mount comprises a component assembly including an outer framework, which is fastened to the structural frame of the vehicle (vessel or equipment). The motor mount further includes an energy absorbing material (compliant) in an interior portion of the component assembly, which is designed to absorb vibration and to attenuate sound and destructive forces. Typically, a secondary framework, consisting of a tube accommodating a mounting bolt, is suspended within this energy absorbing (compliant) material. This central bolt is coupled to a bracket, which is attached to the engine. Often, the component assembly cannot be disassembled without destruction of the energy absorbing (compliant) material in the interior portion of the component assembly. The energy absorbing material adheres to both the outer framework and the secondary framework having the tube and the mounting bolt. The purpose of the above described component assembly is to suspend and hold the engine in place so that vibration/force/sound transfer to the vehicle (vessel or equipment) is significantly reduced. Consequently this increases the life of the engine, structural framework and mounts, and provides improved operator comfort. The energy absorbing (compliant) portion of the component assembly eventually degenerates due to the forces applied to it by the engine through environmental factors such as temperature cycling, chemicals and mechanical fatiguing factors. Similar degradation occurs to other components as described above, where vibration, sound and force are absorbed by an energy absorbing (compliant) material suspended between at least two structural mounting brackets.

For illustration, in the specific case of motor mounts for vehicle engines, motor mounts were previously found on both sides of the engine at the lower side, and also attached to the frame of the vehicle. Modern motor mounts are found in a variety of locations such as the inner fender well, near the base of the radiator, at the base of the firewall, near the top of the radiator or as braces originating from the base of a motor/transmission to the frame of the vehicle. Most vehicles made in the past twenty years or so include three or four motor mounts.

When a component assembly such as a motor mount fails, a costly repair entailing replacement of the entire motor mount is required. A trade-off between the cost of labor and the cost of replacing a degraded motor mount with a new motor mount often dictates decisions about how a repair will be done. Bunker, U.S. Pat. No. 6,349,918 has disclosed a motor mount insert made of polyurethane to retrofit a clamshell designed motor mount typically found in a truck. As discussed above, in many vehicles (vessels and equipment), the energy absorbing (compliant) material cannot be separated out and replaced as disclosed by Bunker, U.S. Pat. No. 6,349,918.

The inventors of this application disclose a repair material system for a component assembly of a vehicle (such as a motor mount) which is coupled to a vibrating member (such as an engine) of the vehicle and convenient procedures of using the repair material system to both repair and permit reuse of the component assembly. These procedures provide cost-effective repairs without requiring a complete retrofit of the component assembly.

SUMMARY OF THE INVENTION

It is an object of the present invention to provide a repair material system for a component assembly of a vehicle which is coupled to a vibrating member of the vehicle.

It is a further object of the present invention to provide a method of using a repair material system to both repair and permit reuse of a component assembly of a vehicle which is coupled to a vibrating member of the vehicle by decoupling the component assembly from the vehicle.

It is a still further object of the present invention to provide a method of using a repair material system to both repair and permit reuse of a component assembly of a vehicle which is coupled to a vibrating member of the vehicle without decoupling the component assembly from the vehicle.

BRIEF DESCRIPTION OF THE PREFERRED EMBODIMENTS

In accordance with one embodiment of the present invention, a repair material system for use in a component assembly is disclosed. The repair material system comprises in combination, an adhesion and sealing material comprising at least one resin, the component assembly comprising a degradable member, a framework and a bolt-housing shaft of the component assembly. The degradable member of the component assembly is coupled in co-operative relationship to both the framework and to the bolt-housing shaft of the component assembly. The adhesion and sealing material adheres to and seals the degradable member of the component assembly when applied to the degradable member of the component assembly thereby permitting both repair of the degradable member and re-use of the component assembly. The repair material system further comprises a vibrating member and the component assembly is coupled to the vibrating member to dampen the vibrating member. The component assembly comprises at least one of a motor mount, a shock absorber end, a sway bar bushing and a control arm bushing.

In accordance with a second embodiment of the present invention, a method for repairing a component assembly with a repair material system is disclosed. The method comprises the steps of providing an adhesion and sealing material comprising at least one resin, providing the component assembly comprises a degradable member, a framework and a bolt-housing shaft of the component assembly, the degradable member of the component assembly coupled in co-operative relationship to both the framework and to the bolt-housing shaft of the component assembly, and providing the adhesion and sealing material adheres to and seals the degradable member of the component assembly when applied to the degradable member of the component assembly thereby permitting both repair of the degradable member and re-use of the component assembly.

The foregoing and other objects, features, and advantages of the invention will be apparent from the following, more detailed description of the preferred embodiments of the invention, as illustrated in the accompanying drawings.

DETAILED DESCRIPTION OF THE PREFERRED EMBODIMENTS

Figure 1:
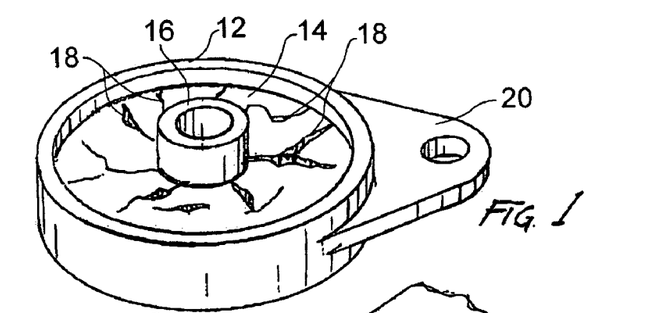
FIG. 1 is a perspective view showing one embodiment of a component assembly comprising a degradable member having two sides, a framework and a bolt-housing shaft with the degradable member in a deteriorated state prior to using a repair material (not shown) in accord with the invention.

According to FIG. 1, one embodiment of a component assembly 10 comprises a degradable member 14, a framework 12 and a bolt-housing shaft 16 of the component assembly 10. The degradable member 14 of the component assembly 10 is coupled in co-operative relationship to both the framework 12 and to the bolt-housing shaft 16 of the component assembly 10. The degradable member 14 having two sides has a multiplicity of deteriorated portions 18 in at least one of the two sides of the degradable member 14. A portion of the component assembly 10 further comprises a brace 20 coupled to a portion 28 of a vehicle, such as at least one structural member of the vehicle (not shown in FIG. 1, but shown in FIGS. 10-13). As shown in FIGS. 10-13, the bolt-housing shaft 16 is coupled to a portion 30 (such as a bracket, a strut and the like) of a vibrating member 32 (such as an engine, a transmission, a vibrating component and the like of the vehicle) to dampen vibrations of the vibrating member 32. Referring to FIG. 1, the component assembly 10 is decoupled from a vehicle (not shown) prior to repair.

Figures 2, 3, 4:
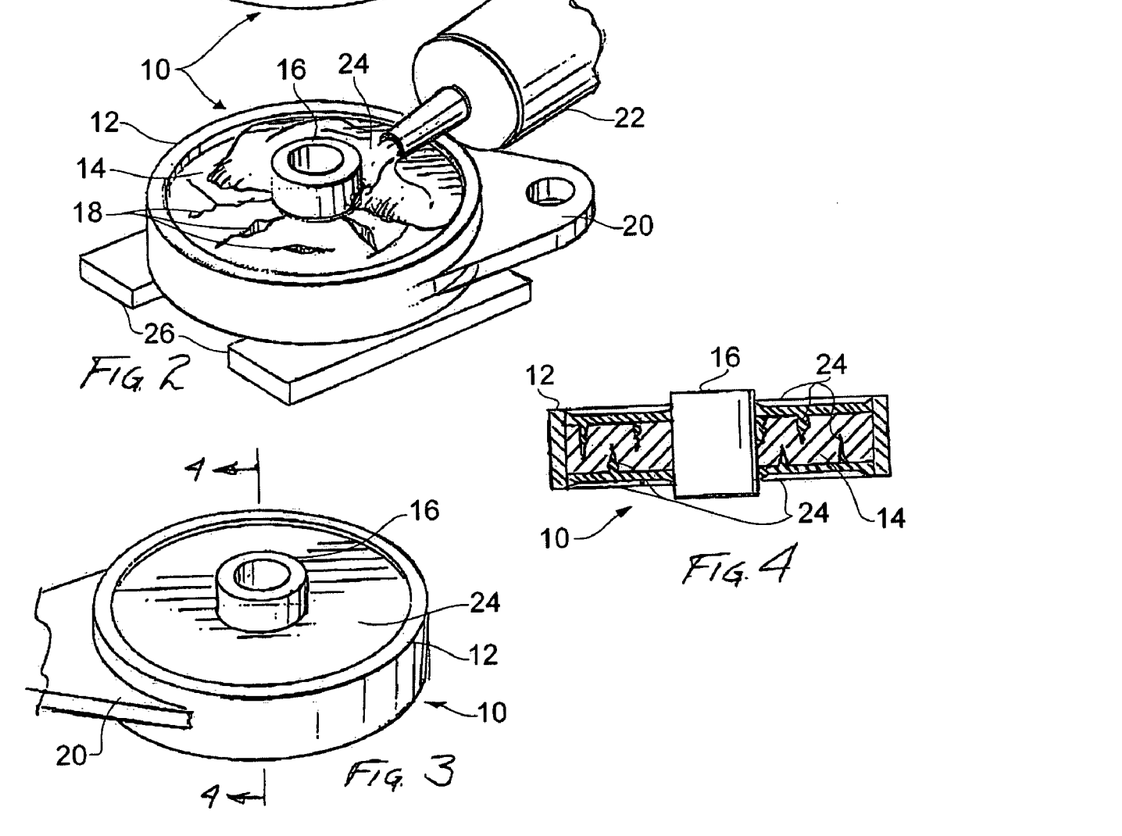
FIG. 2 is a perspective view showing the component assembly of FIG. 1 with the repair material being applied to a portion of one side of the degradable member of the component assembly.
FIG. 3 is a perspective view showing the component assembly of FIG. 1 after the repair material has been applied to a portion of the surface of the degradable member.
FIG. 4 is a sectional view through 4-4 of the component assembly of FIG. 3 showing the repair material embedded within the degradable member.

According to FIG. 2, an adhesion and sealing material 24 adheres to and seals the degradable member 14 of the component assembly 10 when the adhesion and sealing material 24 is applied to the degradable member 14 of the component assembly 10 thereby permitting both repair of the degradable member 14 and re-use of the component assembly 10. In FIG. 2, the adhesion and sealing material is applied from a dispenser 22. It is understood that the dispenser 22 may be a hand held tube, a caulking gun tube, a pressurized aerosol canister with an application tube, an automatic dispensing device and the like.

The adhesion and sealing material 24 may be a one-part material or a multiple-part material, which may be dispensed from a multiple-part dispenser. The adhesion and sealing material 24 comprises at least one resin. A preferred resin is at least one resin of the type unsaturated ethylenic polyester cured with at least one initiator of the type of aliphatic peroxide and aromatic peroxide or a combination of aliphatic and aromatic peroxides. It is understood that other types of unsaturated compounds that are rapidly cured with a hardener or initiator may also be suitable. Curing may be effected by the heat of reaction during polymerization, external heat or by the use of a source of energy such as UV and the like. It is further understood that the resin need not be solely of a type that requires free-radical curing (or hardening). Some examples of resins that may be suitable include thermoplastic polyurethanes which cross-link at a later time by means of a delayed curing mechanism, some types of epoxies, phenolics, high glass temperature thermoplastics such as aromatic polyamides and the like. The resin of the adhesion and sealing material 24 further comprises at least one filler. The at least one filler extends the usable life of the degradable member 14 of the component assembly 10. It is believed that the at least one filler raises the glass transition temperature of the resin, and may additionally improve thermal performance of the resin. Some examples of useful fillers include inorganic and organic fibers, such as glass, aramid, carbon and the like and minerals, such as clay, calcium carbonate, silica, carbon black and the like. The resin of the adhesion and sealing material 24 further comprises at least one elastomer. The at least one elastomer both extends the usable life of the degradable member 14 and is capable of dampening vibrations, attenuating sound transmission and preventing destructive forces in the degradable member 14 of the component assembly 10. Some examples of useful elastomers include synthetic rubbers, such as polyurethanes and urethane-acrylic copolymers, substituted silicones and siloxanes, styrene-butadiene copolymers, acrylic and acrylonitrile copolymers of carboxylic acids, isoprene and chloroprene polymers, polyamides and their copolymers, ethylene-propylene diene terpolymers rubbers and the like. It is understood that the resin of the adhesion and sealing material 24 may comprise both at least one filler and at least one elastomer. The working characteristics of the adhesive and sealing material 24 include rheology suitable for flow into the multiplicity of deteriorated portions 18 and for self-leveling when applied to a portion of the component assembly 10. In addition, the adhesive and sealing material 24 should be workable for a sufficient time so that the adhesive and sealing material 24 may be used to repair the component assembly 10.

In FIG. 2, a portion of the component assembly 10 is supported by a pair of elevated leveling bars 26 and the dhesive and sealing material 24 is applied to a portion of the degradable member 14 resulting in filling of the multiplicity of deteriorated portions 18. FIG. 3 illustrates the appearance of the degradable member 14 after the adhesive and sealing material 24 has been applied. Since the degradable member 14 is coupled in co-operative relationship to both the framework 12 and to the bolt-housing shaft 16 of the component assembly 10, the adhesive and sealing material 24 also adheres to and seals both a portion of the framework 12 and a portion of the bolt-housing shaft 16. Adherence to and sealing of both a portion of the framework 12 and a portion of the bolt-housing shaft 16 is enhanced by cleaning both a portion of the framework 12 and a portion of the bolt-housing shaft 16 prior to applying the adhesive and sealing material 24 (see FIG. 12). It is understood that commonly available substantially non-residue producing solvents may be used as a cleaner 38 (see FIG. 12, which illustrates the use of a brake cleaner 38). FIG. 4 is a sectional view through 4-4 of FIG. 3 of the component assembly 10 after the adhesive and sealing material 24 has been applied to a portion of the degradable member 14 and after the adhesive and sealing material 24 has been cured. According to FIG. 4 the degradable member 14 having the multiplicity of deteriorated portions 18 is now repaired, with the adhesive and sealing material 24 filling both the multiplicity of deteriorated portions 18 and a portion of the surface of both sides of the degradable member 14. FIGS. 2-4 illustrate a process for repairing the degradable member 14 where the bolt-housing shaft 16 is not substantially displaced from its previous location. In the process of FIGS. 2-4, the bolt-housing shaft 16 requires no support from a selective barrier 34 (in contrast, see FIG. 7, where the selective barrier 34 is used).

Figure 5:
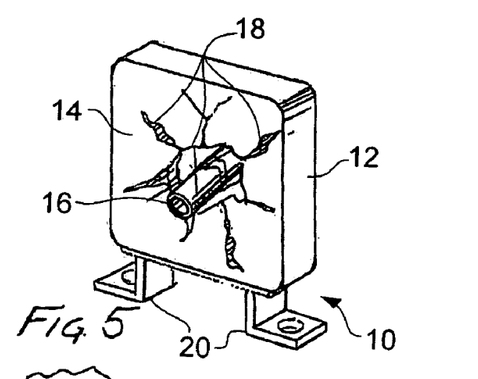
FIG. 5 is a perspective view showing another embodiment of the component assembly having two sides comprising the degradable member having two sides, the framework and the bolt-housing shaft with the degradable member in a deteriorated state prior to using the repair material (not shown) in accord with the invention.

FIGS. 5-9 depict a process for repairing another embodiment of the component assembly 10. Referring to FIG. 5 the component assembly 10 comprises the degradable member 14, the framework 12 and the bolt-housing shaft 16 of the component assembly 10, as described above for the embodiment of the component assembly 10 of FIGS. 1-4. The component assembly 10 of FIGS. 5-9 further comprises a pair of braces 20 coupled to a portion 28 of a vehicle (not shown) and the degradable member 14 of the component assembly 10 of FIGS. 5-9 comprises a multiplicity of deteriorated portions 18. The component assembly 10 is decoupled from a vehicle (not shown) prior to repair.

Figure 6:
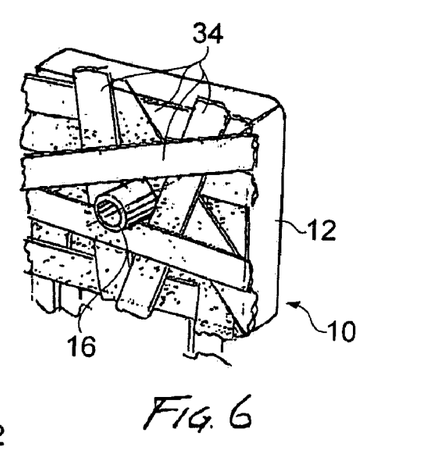
FIG. 6 is a perspective view showing the bolt-housing shaft of the interior portion of the component assembly of FIG. 5 surrounded by a barrier coupled to one side of the component assembly.
Figure 7:
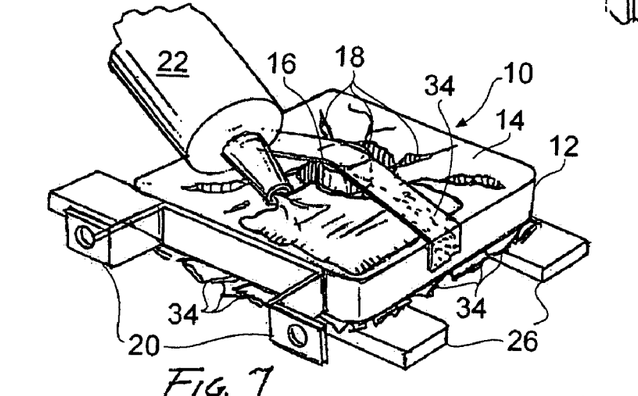
FIG. 7 is a perspective view showing the bolt-housing shaft of the component assembly of FIG. 5 supported by a tape on the opposite side of the component assembly to permit alignment of the bolt-housing shaft with the repair material being applied to a portion of one side of the degradable member.
Figures 8, 9:
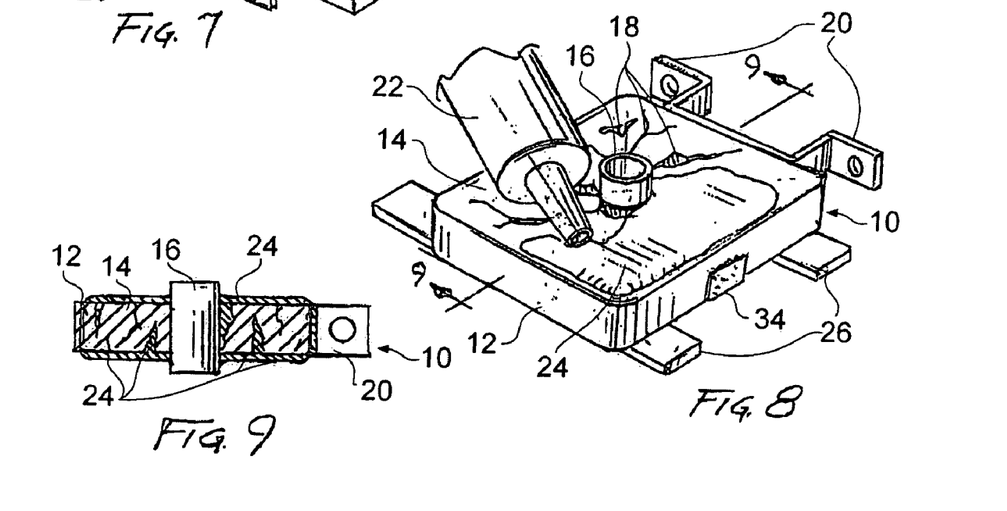
FIG. 8 is a perspective view showing the component assembly of FIG. 5 after the repair material has been applied to a portion of one side of the degradable member.
FIG. 9 is a sectional view through 9-9 of the component assembly of FIG. 8 showing the repair material embedded within the degradable member.

According to FIGS. 5-7, the degradable member 14 is deteriorated to the extent that the bolt-housing shaft 16 embedded in the degradable member 14 is supported using the selective barrier 34. It is understood that the selective barrier 34 may be a removable tape such as a pressure sensitive tape and the like or a flat supporting material such as wood, cardboard and the like, where the flat supporting material has a cut-out for supporting the bolt-housing shaft 16. During the process of repairing the component assembly 10, the flat supporting material functions as the selective barrier 34 to be coupled to a portion of a first side of the framework 12 of the component assembly 10 thereby blocking loss of the adhesion and sealing material 24 from a second side of the degradable member 14 when the adhesion and sealing material 24 is introduced to the first side of the degradable member 14 of the component assembly 10. Referring to FIG. 7, the selective barrier 34 is coupled to both a portion of the bolt-housing shaft 16 and a portion of the framework 12 of the component assembly 10 on the first side of the component assembly 10 when the adhesion and sealing material 24 is applied to a portion of the degradable member 14 of the component assembly 10, and the selective barrier is coupled to a portion of the second side of the component assembly 10 as shown in FIG. 6. In FIG. 7, the component assembly 10 is supported on a pair of elevated leveling bars 26 and the adhesive and sealing material 24 is applied to a portion of the degradable member 14 resulting in filling of the multiplicity of deteriorated portions 18. It is understood that the pair of leveling bars 26 are simply illustrative of a procedure where the component assembly 10 is raised prior to applying the adhesion and sealing material 24 to a portion of the degradable member 14 of the component assembly 10. The rheology of the adhesion and sealing material 24 does not require that the adhesion and sealing material 24 be applied in any particular orientation. It is preferred that the adhesion and sealing material 24 be applied in an S-shaped back and forth motion. It is also preferred that the adhesion and sealing material 24 completely cover the surface of the degradable member 14. After the adhesion and sealing material 24 has been applied to a portion of the degradable member 14 on the first side of the component assembly 10 and the adhesion and sealing material 24 is hardened (or cured), the selective barrier 34 on the second side of the component assembly 10 is removed and the adhesion and sealing material 24 is applied to a portion of the degradable member 14 of the second side of the component assembly 10 (see FIG. 8). The adhesion and sealing material 24 is hardened (or cured) and the repaired component assembly 10 may be re-used. It is understood that the adhesion and sealing material 24 may be applied to both the first side and the said second side of the component assembly 10 without waiting for hardening (or curing) of the adhesion and sealing material 24. FIG. 9 shows a sectional view through 9-9 of FIG. 8 of the component assembly 10 after the repair process described above and as depicted in FIGS. 6-8.

Figures 10, 11:
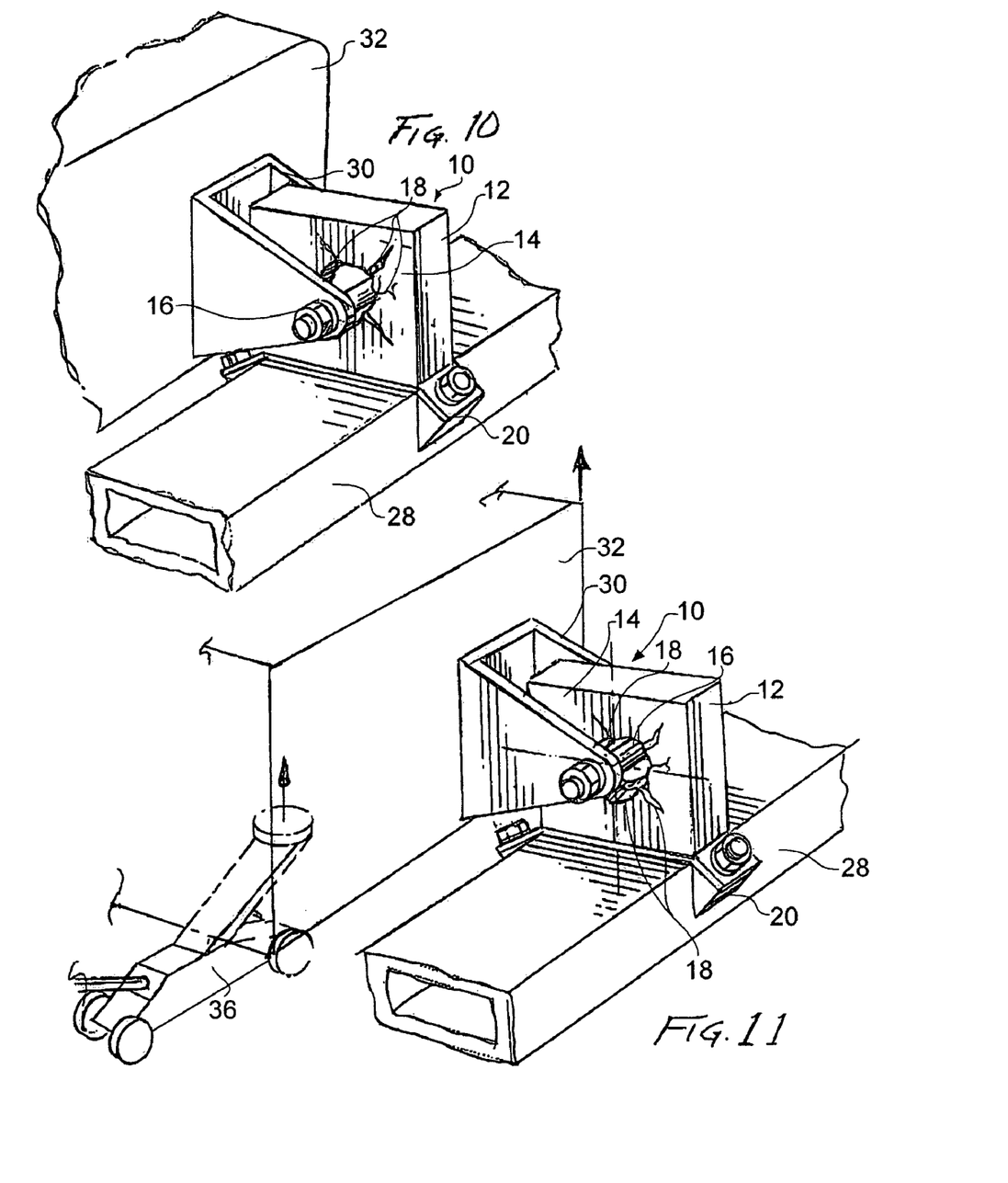
FIG. 10 is a perspective view showing yet another embodiment of the component assembly comprising the degradable member having two sides, the framework and the bolt-housing shaft with the degradable member in a deteriorated state, prior to using the repair material (not shown), and the component assembly coupled to a portion of a vibrating member in accord with the invention.
FIG. 11 is a perspective view of the combined component assembly and a portion of the vibrating member of FIG. 10 and with the vibrating member buttressed by a jack permitting alignment of the bolt-housing shaft in the degradable member prior to using the repair material (not shown).
Figures 12, 13, 14:
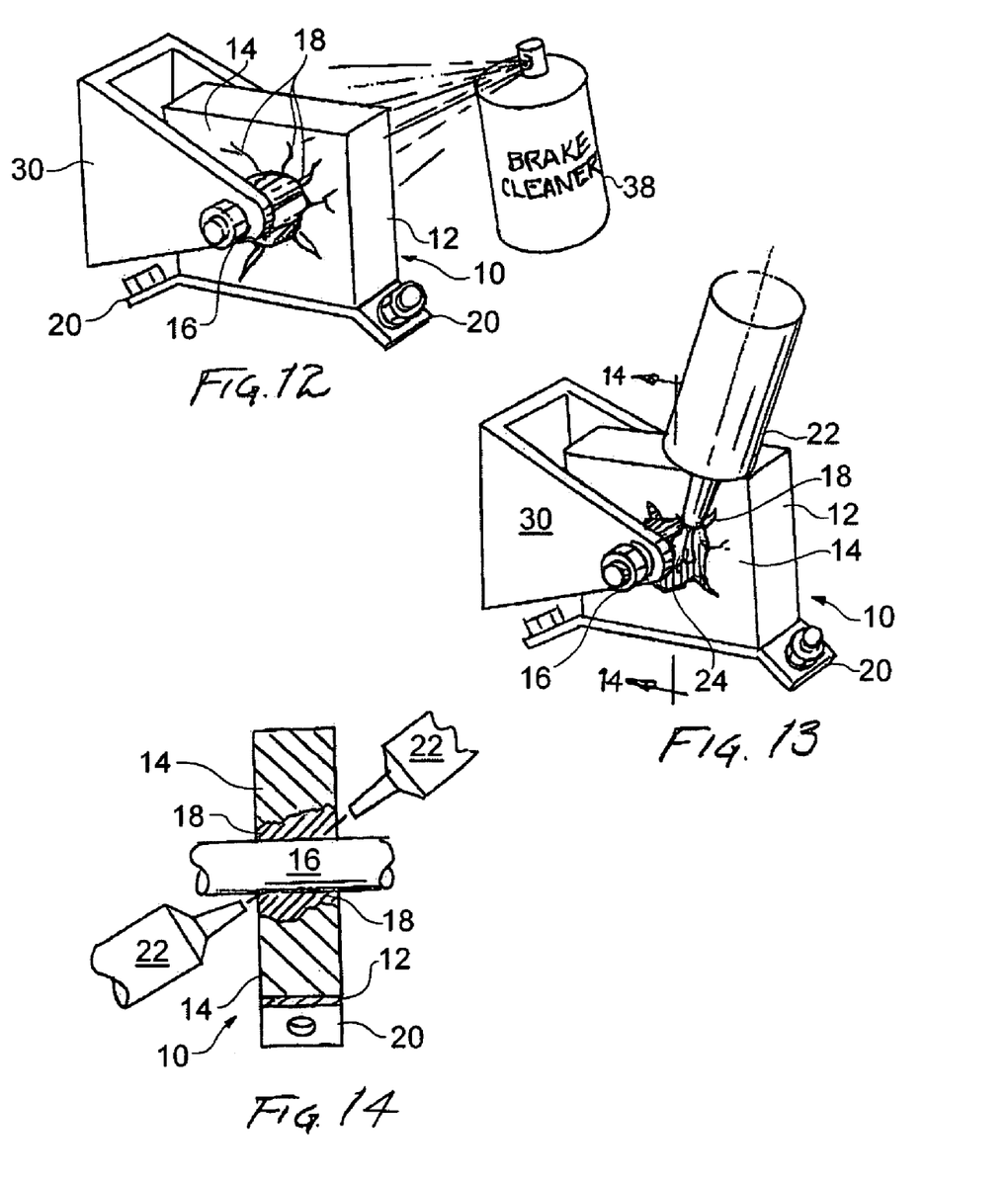
FIG. 12 is a perspective view of the combined component assembly and a portion of the vibrating member of FIG. 10 and a cleaner being applied to a portion of the component assembly prior to applying the repair material (not shown) to a portion of one side of the degradable member.
FIG. 13 is a perspective view of the combined component assembly and a portion of the vibrating member of FIG. 10 with the repair material being applied to a portion of one side of the degradable member of the component assembly.
FIG. 14 is a sectional view through 14-14 of the combined component assembly and the vibrating member of FIG. 13 showing the repair material being applied to a portion of each one of the two sides of the degradable member of the component assembly.

FIGS. 10-14 depict yet another process for repairing an embodiment of the component assembly 10 when the component assembly 10 remains coupled to a portion of a vehicle. Referring to FIGS. 10 and 11, the component assembly 10 is similar to the component assembly 10 of FIGS. 5-9 (see description above) with the pair of braces 20 coupled to a portion 28 of a vehicle, such as at least one structural member of the vehicle. Additionally, the bolt-shaft housing 16 is coupled to a portion 30 (such as a bracket, a strut and the like) of a vibrating member 32 (such as an engine, a transmission, a vibrating component and the like of the vehicle) to dampen vibrations of the vibrating member 32. Referring to FIG. 11, the vibrating member 32 is buttressed by using a jack 36, although it is understood that blocks of metal, wood or a block and tackle, and the like may also serve the same function of buttressing the vibrating member 32. The bolt-housing shaft 16 is aligned to a position in the degradable member 14 before the degradable member 14 of the component assembly 10 was deteriorated (see FIG. 11). Referring further to FIGS. 12-14, a procedure for repairing the component assembly 10, in-situ without decoupling the component assembly 10 from the vibrating member 32 or decoupling from the portion 28 of the vehicle follows essentially the same steps as shown for the repair of the component assembly 10 depicted in FIGS. 1-4 (see description above). In the depictions of FIGS. 10-14, no selective barrier 34 is used, although it is understood that the selective barrier 34 may be used as shown in the repair process depicted in FIGS. 5-9 (see description above).

Statement of Procedures Used

A method for repairing any one embodiment of the component assembly 10 with a repair material system comprises initial steps of providing an adhesion and sealing material 24 which comprises at least one resin, providing the component assembly 10 includes the degradable member 14, the framework 12 and the bolt-housing shaft 16, and the degradable member 14 coupled in co-operative relationship to both the framework 12 and to the bolt-housing shaft 16 of the component assembly 10, and providing the adhesion and sealing material 24 adheres to and seals the degradable member 14 of the component assembly 10 when applied to the degradable member 14 of the component assembly 10. Additional initial steps of the method include providing the vibrating member 32, the component assembly 10 being coupled to the vibrating member 32 and providing the degradable material 14 having a first side and a second side.

In the case depicted by FIGS. 1-4 (and described above) after the initial steps of the method described above, further steps of the method include decoupling the component assembly 10 from the vibrating member 32; selectively cleaning a portion of a surface of the component assembly 10 to enhance adhesion of the adhesion and sealing material 24 to the component assembly 10; supporting a portion of the second side of the component assembly 10; applying the adhesion and sealing material 24 to a portion of the first side of the degradable member 14 thereby covering a substantial portion of a surface of the degradable member 14; hardening the adhesion and sealing material 24; supporting a portion of the first side of the component assembly 10; selectively applying the adhesion and sealing material 24 to a portion of a surface of the second side of the degradable member 14; and hardening the adhesion and sealing material 24 thereby permitting both repair of the degradable member 14 and reuse of the component assembly 10 after coupling the component assembly 10 to the vibrating member 32.

In the case depicted by FIGS. 5-9 (and described above), after the initial steps of the method described above, further steps of the method include decoupling the component assembly 10 from the vibrating member 32; selectively cleaning a portion of a surface of the component assembly 10 to enhance adhesion of the adhesion and sealing material 24 to the component assembly 10; providing the selective barrier 34; supporting the bolt-housing shaft 16 with the selective barrier 34; aligning the bolt-housing shaft 16 to a position in the degradable member 14 before the degradable member 14 was deteriorated; coupling the selective barrier 34 to a portion of one side of the framework 12 thereby blocking loss of the adhesion and sealing material 24 from the second side of the degradable member 14 when the adhesion and sealing material 24 is introduced to the first side of the degradable member 14; supporting a portion of the second side of the component assembly 10; applying the adhesion and sealing material 24 to the first side of the degradable member 14; hardening the adhesion and sealing material 24; and decoupling the selective barrier 34 from the one side of the framework 12 when the adhesion and sealing material 24 hardens. Further steps of the method include examining the second side of the degradable member 14; supporting a portion of the first side of the component assembly 10; selectively applying the adhesion and sealing material 24 to a portion of a surface of the second side of the degradable member 14; and hardening the adhesion and sealing material 24.

In one variation of the case depicted by FIGS. 10-14 (where a selective barrier 34 is not used) and as described above, after the initial steps of the method described above, further steps of the method include buttressing the vibrating member 32 to align the bolt-housing shaft 16 to a position in the degradable member 14 before the degradable member 14 was deteriorated (instead of decoupling the component assembly 10 from the vibrating member 32); selectively cleaning a portion of a surface of the component assembly 10 to enhance adhesion of the adhesion and sealing material 24 to the component assembly 10; applying the adhesion and sealing material 24 to a portion of the first side of the degradable member 14; and hardening the adhesion and sealing material 24 thereby repairing at least the first side of the degradable member 14 of the component assembly 10. Further steps of the method include, examining the second side of the degradable member 14; selectively applying the adhesion and sealing material 24 to a portion of a surface of the second side of the degradable member 14; and hardening the adhesion and sealing material 24 thereby permitting both repair of the degradable member 14 and reuse of the component assembly 10 in combination with the vibrating member 32 when the vibrating member 32 is no longer buttressed.

In another variation of the case depicted by FIGS. 10-14 (where a selective barrier 34 is used), the method includes buttressing the vibrating member 32 to align the bolt-housing shaft 16 to a position in the degradable member 14 before the degradable member 14 was deteriorated; selectively cleaning a portion of a surface of the component assembly 10 to enhance adhesion of the adhesion and sealing material 24 to the component assembly 10; providing a selective barrier 34; coupling the selective barrier 34 to a portion of one side of the framework 12 thereby blocking loss of the adhesion and sealing material 24 from the second side of the degradable member 14 when the adhesion and sealing material 24 is introduced to the first side of the degradable member 12; applying the adhesion and sealing material 24 to a portion of the first side of the degradable member 14; hardening the adhesion and sealing material 24; and decoupling the selective barrier 34 from the one side of the framework 12 of the component assembly 10 when the adhesion and sealing material 24 hardens. The method further includes examining the second side of the degradable member 14; selectively applying the adhesion and sealing material 24 to a portion of a surface of the second side of the degradable member 14; and hardening the adhesion and sealing material 24.

While the disclosure has been particularly shown and described with reference to preferred embodiments thereof, it will be understood by those skilled in the art that the foregoing and other changes in form and details may be made therein without departing from the spirit and scope of the disclosure.

What is claimed is:

1. A method for repairing a component assembly with a repair material system comprising the steps of:
   providing an adhesion and sealing material comprising at least one resin;
   providing a vibrating member;
   providing said component assembly coupled to said vibrating member comprising a degradable member having a first side and a second side, a framework and a bolt-housing shaft of said component assembly, said degradable member of said component assembly coupled in co-operative relationship to both said framework and to said bolt-housing shaft of said component assembly;
   decoupling said component assembly from said vibrating member;
   selectively cleaning a portion of a surface of said component assembly to enhance adhesion of said adhesion and sealing material to said component assembly;
   providing a selective barrier;
   supporting said bolt-housing shaft of said component assembly with said selective barrier;
   aligning said bolt-housing shaft to a position in said degradable member before said degradable member of said component assembly deteriorated;
   coupling said selective barrier to a portion of one side of said framework of said component assembly thereby blocking loss of said adhesion and sealing material from said second side of said degradable member when said adhesion and sealing material is introduced to said first side of said degradable member of said component assembly;
   supporting a portion of said second side of said component assembly;
   applying said adhesion and sealing material to said first side of said degradable member of said component assembly thereby covering a substantial portion of a surface of said degradable member, said adhesion and sealing material adhering to and sealing said degradable member of said component assembly when applied to said degradable member of said component assembly thereby permitting both repair of said degradable member and reuse of said component assembly;
   hardening said adhesion and sealing material;
   and decoupling said selective barrier from said one side of said framework of said component assembly when said adhesion and sealing material hardens thereby repairing at least said first side of said degradable member of said component assembly.

2. The method according to claim 1 further comprising the steps of: supporting a portion of said second side of said component assembly; applying said adhesion and sealing material to said first side of said degradable member of said component assembly thereby covering a substantial portion of a surface of said degradable member; hardening said adhesion and sealing material; supporting a portion of said first side of said component assembly; selectively applying said adhesion and sealing material to a portion of a surface of said second side of said degradable member; and hardening said adhesion and sealing material thereby permitting both repair of said degradable member and reuse of said component assembly after coupling said component assembly to said vibrating member.

3. The method according to claim 1 further comprising the steps of: examining said second side of said degradable member; supporting a portion of said first side of said component assembly; selectively applying said adhesion and sealing material to a portion of a surface of said second side of said degradable member; and hardening said adhesion and sealing material thereby permitting both repair of said degradable member and reuse of said component assembly after coupling said component assembly to said vibrating member.

4. The method according to claim 1 further comprising the steps of: providing a vibrating member, said component assembly coupled to said vibrating member; buttressing said vibrating member to align said bolt-housing shaft to a position in said degradable member before said degradable member of said component assembly deteriorated; cleaning a portion of a surface of said component assembly to enhance adhesion of said adhesion and sealing material to said component assembly; and providing said degradable material having a first side and a second side.

5. The method according to claim 4 further comprising the steps of: applying said adhesion and sealing material to said first side of said degradable member of said component assembly thereby covering a substantial portion of a surface of said degradable member; and hardening said adhesion and sealing material thereby repairing at least said first side of said degradable member of said component assembly.

6. The method according to claim 5 further comprising the steps of: examining said second side of said degradable member; selectively applying said adhesion and sealing material to a portion of a surface of said second side of said degradable member; and hardening said adhesion and sealing material thereby permitting both repair of said degradable member and reuse of said component assembly in combination with said vibrating member when said vibrating member is no longer buttressed.

7. The method according to claim 4 further comprising the steps of: providing a selective barrier; coupling said selective barrier to a portion of one side of said framework of said component assembly thereby blocking loss of said adhesion and sealing material from said second side of said degradable member when said adhesion and sealing material is introduced to said first side of said degradable member of said component assembly; applying said adhesion and sealing material to a portion of said first side of said degradable member of said component assembly thereby covering a substantial portion of a surface of said degradable member; hardening said adhesion and sealing material; and decoupling said selective barrier from said one side of said framework of said component assembly when said adhesion and sealing material hardens thereby repairing at least said first side of said degradable member of said component assembly.

8. The method according to claim 7 further comprising the steps of: examining said second side of said degradable member; selectively applying said adhesion and sealing material to a portion of a surface of said second side of said degradable member; and hardening said adhesion and sealing material thereby permitting both repair of said degradable member and reuse of said component assembly in combination with said vibrating member when said vibrating member is no longer buttressed.

9. A method for repairing a component assembly with a repair material system comprising the steps of:

providing an adhesion and sealing material comprising at least one resin;

providing said component assembly coupled to a vibrating member and comprising a degradable member having a first and second side, a framework and a bolt-housing shaft of said component assembly, said degradable member of said component assembly coupled in co-operative relationship to both said framework and to said bolt-housing shaft of said component assembly;

said adhesion and sealing material adhering to and sealing said degradable member of said component assembly when applied to said degradable member of said component assembly thereby permitting both repair of said degradable member and re-use of said component assembly;

buttressing said vibrating member to align said bolt-housing shaft to a position in said degradable member before said degradable member of said component assembly deteriorated;

cleaning a portion of a surface of said component assembly to enhance adhesion of said adhesion and sealing material to said component assembly;

providing a selective barrier;

coupling said selective barrier to a portion of one side of said framework of said component assembly thereby blocking loss of said adhesion and sealing material from said second side of said degradable member when said adhesion and sealing material is introduced to said first side of said degradable member of said component assembly;

applying said adhesion and sealing material to a portion of said first side of said degradable member of said component assembly thereby covering a substantial portion of a surface of said degradable member;

hardening said adhesion and sealing material;

and decoupling said selective barrier from said one side of said framework of said component assembly when said adhesion and sealing material hardens thereby repairing at least said first side of said degradable member of said component assembly.

10. The method according to claim 9 further comprising the steps of: examining said second side of said degradable member;

selectively applying said adhesion and sealing material to a portion of a surface of said second side of said degradable member; and hardening said adhesion and sealing material thereby permitting both repair of said degradable member and reuse of said component assembly in combination with said vibrating member when said vibrating member is no longer buttressed.

* * * * *